(12) United States Patent
Baumgardner et al.

(10) Patent No.: US 10,383,478 B2
(45) Date of Patent: Aug. 20, 2019

(54) INDUSTRIAL FOOD FRYER

(71) Applicant: John Bean Technologies Corporation, Chicago, IL (US)

(72) Inventors: Troy Ora Baumgardner, Huron, OH (US); William Douglas Medley, Clyde, OH (US); Adam Jay Ramsdell, Sandusky, OH (US)

(73) Assignee: JOHN BEAN TECHNOLOGIES CORPORATION, Chicago, IL (US)

( * ) Notice: Subject to any disclaimer, the term of this patent is extended or adjusted under 35 U.S.C. 154(b) by 883 days.

(21) Appl. No.: 14/512,220

(22) Filed: Oct. 10, 2014

(65) Prior Publication Data
US 2015/0101492 A1  Apr. 16, 2015

Related U.S. Application Data

(60) Provisional application No. 61/889,933, filed on Oct. 11, 2013.

(51) Int. Cl.
*A47J 37/12* (2006.01)

(52) U.S. Cl.
CPC .......... *A47J 37/1214* (2013.01); *A47J 37/129* (2013.01); *A47J 37/1285* (2013.01)

(58) Field of Classification Search
CPC .. A47J 37/1285; A47J 37/129; A47J 37/1295; A47J 37/1214
USPC ........................ 99/403, 404, 405–407, 443 C
See application file for complete search history.

(56) References Cited

U.S. PATENT DOCUMENTS

| | | | | |
|---|---|---|---|---|
| 3,353,962 A | * | 11/1967 | Smith, Jr. ........... | A47J 37/1214 426/242 |
| 4,366,749 A | * | 1/1983 | Caridis ............... | A47J 37/1214 426/438 |
| 4,903,683 A | * | 2/1990 | Larsen ................ | A47J 37/0713 126/25 B |
| 6,073,540 A | * | 6/2000 | Garrett .................... | A23L 3/022 62/374 |
| 7,798,058 B2 | * | 9/2010 | Basker ................ | A47J 37/1214 99/404 |
| 8,464,635 B1 | * | 6/2013 | Sprinkle ............. | A47J 37/1214 99/403 |
| 2008/0295706 A1 | * | 12/2008 | Cohn .................. | A47J 37/1295 99/416 |

* cited by examiner

*Primary Examiner* — Arthur O. Hall
*Assistant Examiner* — Christopher R Dandridge
(74) *Attorney, Agent, or Firm* — Christensen O'Connor Johnson Kindness PLLC

(57) ABSTRACT

A cooking tank 112 for a food fryer 100 includes a lower heating zone 154 for receiving a heating element of heat exchanger 120, and an upper product zone 152 in which a product transporting conveying system 122 is positioned. The lower heating zone of the tank 112 is narrower in width than the upper product zone 154 of the tank. Conveyor side bars 140 extend upwardly from shoulders 170 extending laterally from the narrower side walls at the heating zone of the tank to the wider side walls 168 at the product zone of the tank. Conveyor side bars 140 extend upwardly from the shoulders 170, inwardly of the side walls 168, to support the conveying system 122.

16 Claims, 5 Drawing Sheets

INDUSTRIAL FOOD FRYER

CROSS-REFERENCE TO RELATED APPLICATION

This application claims the benefit of U.S. Provisional Application No. 61/889,933, filed Oct. 11, 2013, the disclosure of which is hereby incorporated by reference herein in its entirety.

BACKGROUND

Industrial food fryers typically are constructed with an elongated tank or trough filled with heated oil. A conveyor or other type of mechanism is used to convey food through the heated oil in the tank and then remove the food from the tank. As the food travels through the tank, it is cooked by the heated oil.

Industrial fryers are very energy intensive. At high volumes of cooking, the amount of heat energy needed to heat and maintain the temperature of the cooking oil is substantial. Also, controlling the temperature of the cooking oil is not always successful. If the cooking temperature of the heated oil is inconsistent, likely some of the food will be overcooked since it is necessary to make sure that all the food is sufficiently cooked.

In the past, industrial fryers have been constructed so as to utilize a smaller volume of oil, thereby to reduce energy consumption. However, this often results in thermal instability of the cooking oil. Thus, there is a need for an industrial fryer that is energy efficient and still capable of providing a consistent temperature cooking oil to the food being cooked.

SUMMARY

A cooking tank for a food fryer or processor has a length and width configured to hold cooking oil. The tank houses a conveying system for conveying food to be cooked through the cooking tank and is also adapted to house a heater located below the conveying system for heating the cooking oil. The cooking tank has a lower heating zone for housing the heating system or receiving heating cooking oil from the exterior source. The cooking tank also includes an upper product zone to which the food being cooked is conveyed by the conveying system. The tank in the lower heating zone has a narrower width than the width of the tank at the upper product zone.

In accordance with a further aspect of the present disclosure, a lateral shoulder forms a transition between the narrower lower tank portion corresponding to the heating zone and the wider upper tank portion corresponding to the product zone. The shoulder thus extends outwardly from the width of the tank of the lower heating zone for supporting the conveying system. The conveying system is supported by side bars extending upwardly from the tank shoulder, and thus the side bars are spaced inwardly from the side walls of the upper product zone.

In accordance with another aspect of the present disclosure, a hold down conveyor system is positioned above the food product conveying system, with the hold down conveyor system having a lower run spaced above the conveying run of the food product conveying system.

In accordance with a further aspect of the present disclosure, a sediment conveying system is positioned along the bottom of the cooking tank to collect and remove sediment from the cooking tank.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
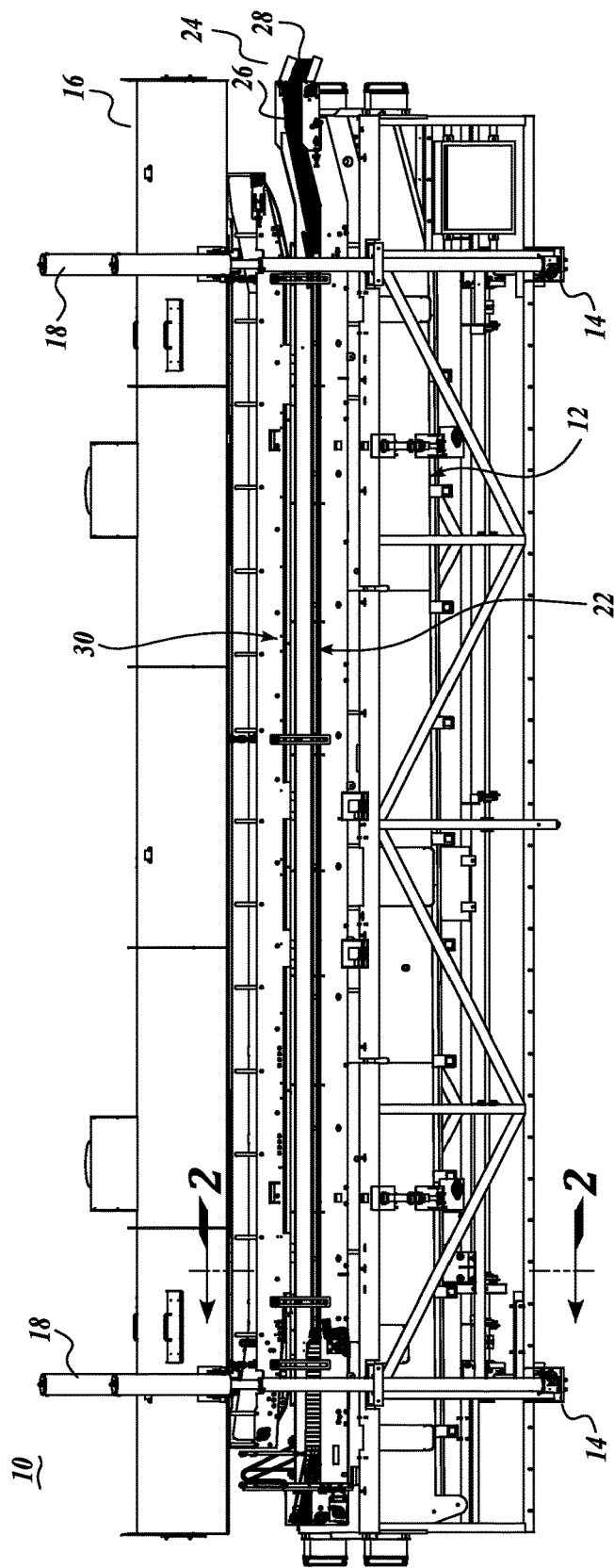
FIG. 1 is a side elevational view of a prior art industrial frying apparatus.
Figure 2:
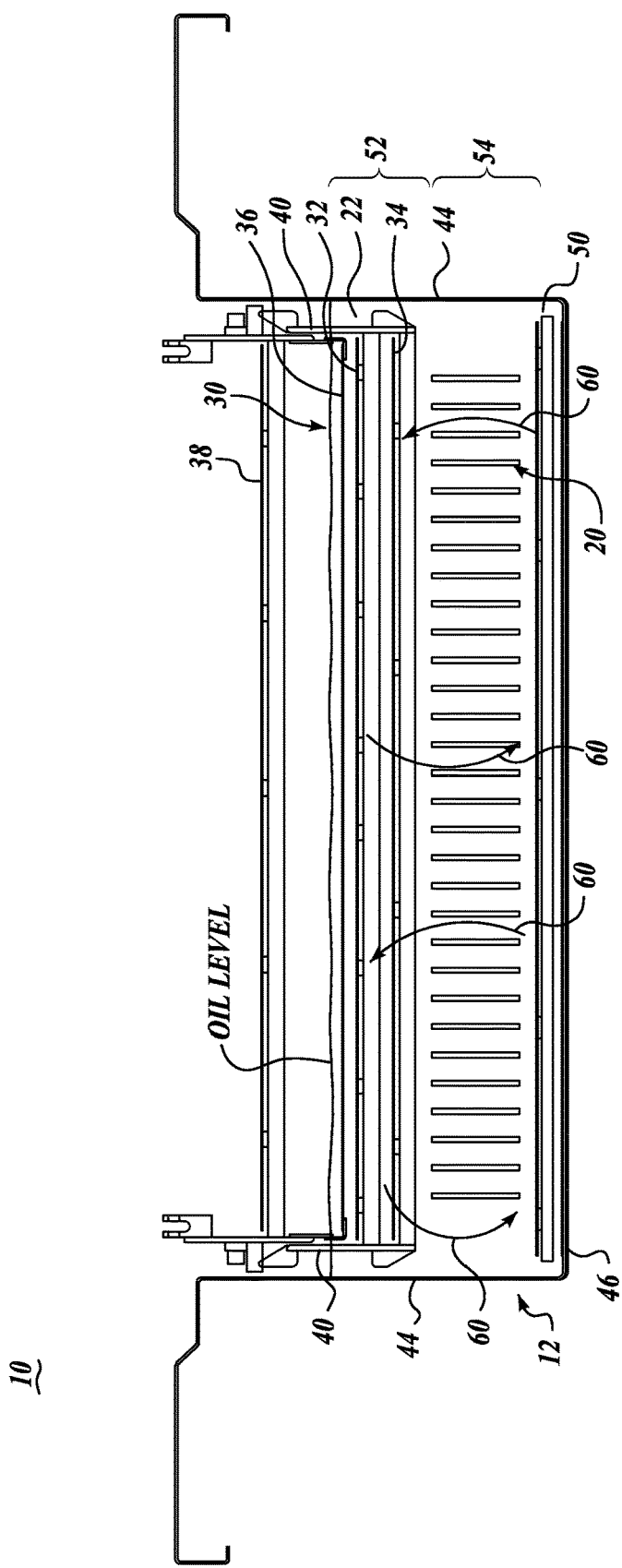
FIG. 2 is a fragmentary cross-sectional view of the frying apparatus of FIG. 1, showing the construction of the fryer tank with the heating elements and conveyor positioned within the fryer tank.

Referring initially to FIGS. 1 and 2, a prior art industrial frying apparatus 10 is illustrated. The apparatus 10 includes a tank or trough 12 supported on a plurality of spaced-apart legs 14 extending downwardly from the underside of the trough to support the trough above the floor. A hood 16 is shown in upwardly retracted position. The hood 16 may be raised and lowered by lifting actuators 18 which are spaced along each side of the trough 12. The actuators 18 may be hydraulically, pneumatically, or electrically controlled.

A heating element or heat exchanger 20 is positioned in the tank 12, as shown in FIG. 2. In addition, a conveyor 22 is shown in FIGS. 1 and 2, as positioned beneath the hood 16 and above a heat exchanger 20. The conveyor 22 conveys food to be fried from left to right in FIG. 1. The outlet end 24 of the conveyor 22 is in the form of an upward ramp section 26 that delivers the cooked food to an exit slide 28. A collection container or take away conveyor (not shown) may be positioned beneath the exit slide 28.

A hold down conveyor 30 may be used to hold the food being cooked downwardly within the cooking oil as the food is being conveyed through the trough 12 on conveyor 22. See FIG. 2. Such hold down conveyor 30 may or may not extend the full length of the main conveyor 22.

FIG. 2 depicts in cross-section portions of the frying apparatus of FIG. 1, wherein the main conveyor 22 is illustrated as disposed within tank 12 above heat exchanger 20 located in the lower portion of the tank. As shown in FIG. 2, conveyor 22 includes an upper run 32 on which food being cooked is carried, and a lower return run 34. The hold down conveyor 30 is shown disposed above the main conveyor 32. The lower run 36 of the hold down conveyor is shown spaced slightly above the conveying run 32 of the conveyor 22. The return run 38 of the hold down conveyor is positioned above the hold down run 36. Conveyor side bars 40 support the main conveyor 22 within the tank 12. The conveyor 22 is raised and lowered relative to the tank 12 by lifting actuators spaced along the length of the frying apparatus 10.

As shown in FIG. 2, tank 12 has vertical side walls 44 that intersect with a flat bottom floor section 46. A sediment conveyor 50 is schematically illustrated as positioned along the tank floor 46. The purpose of the sediment conveyor is to seek to collect and remove sediment, such as batter or breading, which has detached from the food being cooked.

In use, when food is being carried through the apparatus 10 by main conveyor 22 and the oil within the tank 12 is heated by the heat exchanger 20, the cold food product entering the upper portion of the tank, in what is termed the "product zone" 52, causes the oil temperature to drop. As a consequence, a control system which controls the operation of the frying apparatus 10 requests more heat from the heating elements 20 in an effort to maintain a set cooking oil temperature. Thereupon, the heat exchanger transfers more heat to the cooking oil and raise the temperature of the oil in the lower "heating zone" 54 wherein the heater/heat exchanger 20 is located. The hotter oil in the heating zone is less dense than the cooler oil in the product cooking zone, causing the hot oil to rise and the cooler oil to drop, creating a cyclical flow of the cooking oil in the tank 12, as shown by the arrows 60 in FIG. 2.

As shown in FIG. 2, cooking oil is located in the tank 12 laterally outwardly from the sides of the heat exchanger 20 as well as laterally outwardly of the conveyors 22 and 30. The oil at these locations adds to the overall volume of the oil within the tank 12.

One drawback of existing frying apparatuses, such as that shown in FIGS. 1 and 2, is that the larger the oil volume within the tank, the greater the volume of oil that has to move or circulate in order to sense a lowered temperature of the oil in the product zone, thereby increasing the time duration between reduction of oil temperature, reaction of the control system to the lowered cooking oil temperature and the subsequent heating of the oil in the heating zone to provide oil at a sufficient temperature in the product zone. On the other hand, if the oil volume within the tank is too small, the system may be more reactive, but the lower volume of oil may result in an unstable situation in which the cooking oil temperature decreases too rapidly due to the cold food product introduced into the frying apparatus and then is heated too rapidly in the heating zone.

Figure 3:
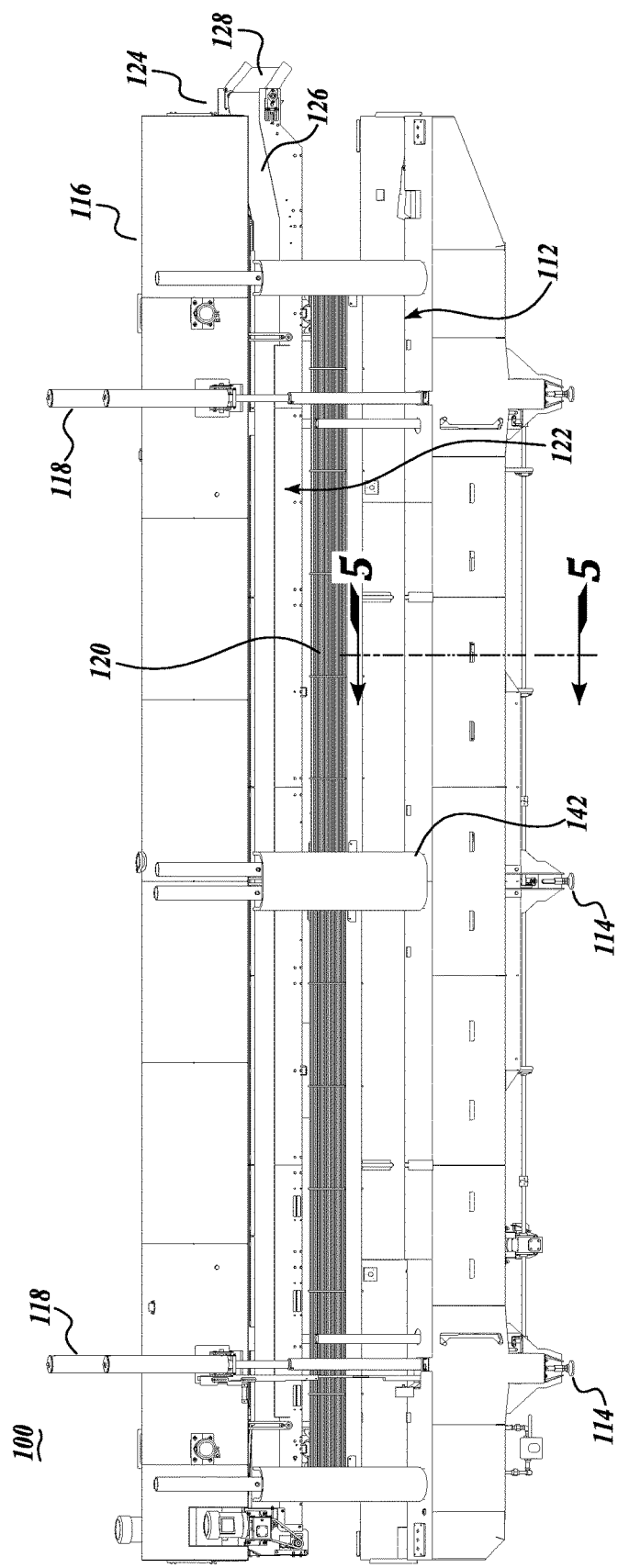
FIG. 3 is a side elevational view of industrial frying apparatus constructed according to the present disclosure with the food conveyor and heating element in an upward, retracted position.
Figure 4:
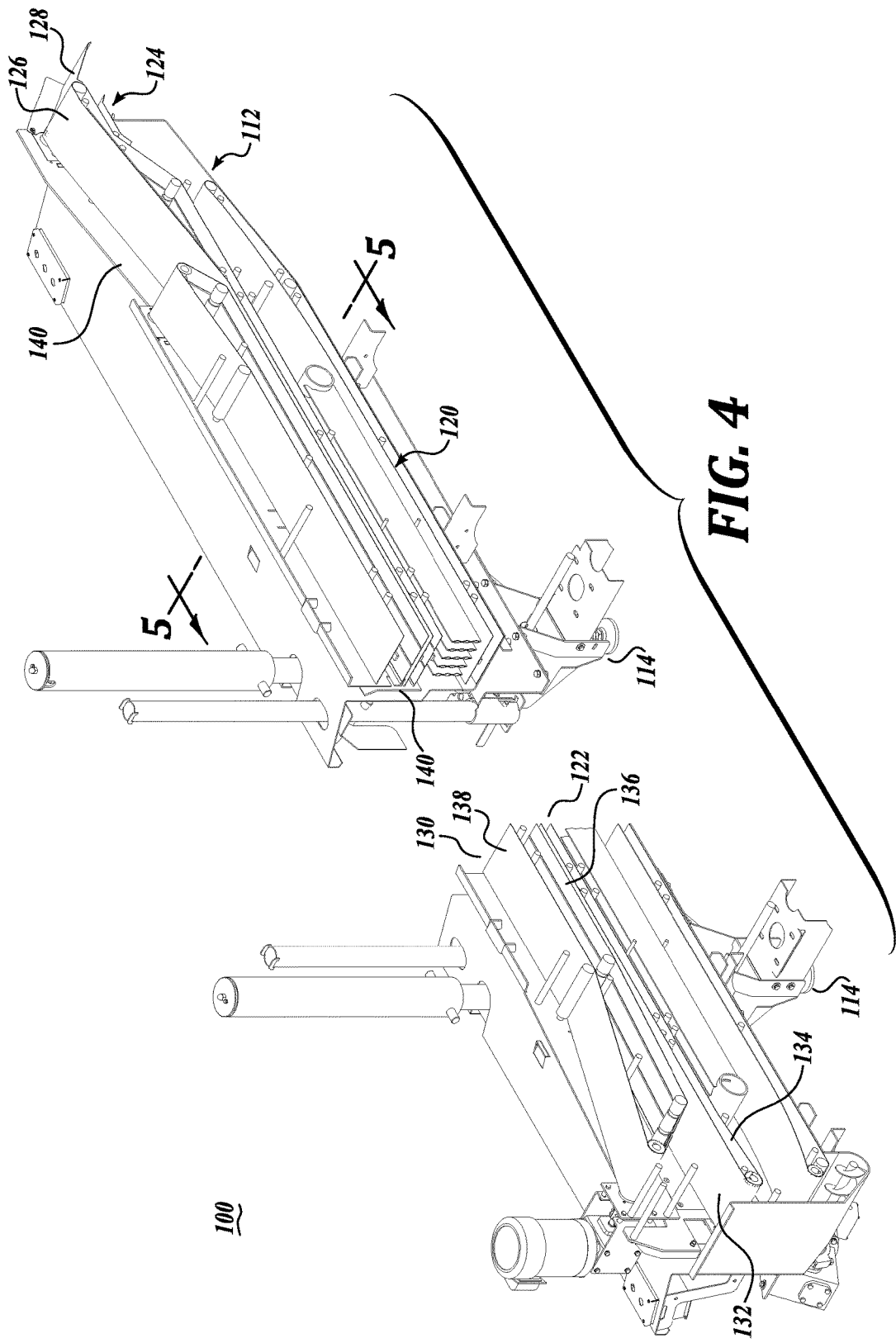
FIG. 4 is a fragmentary isometric, cross-sectional view of a frying apparatus shown in FIG. 3.
Figure 5:
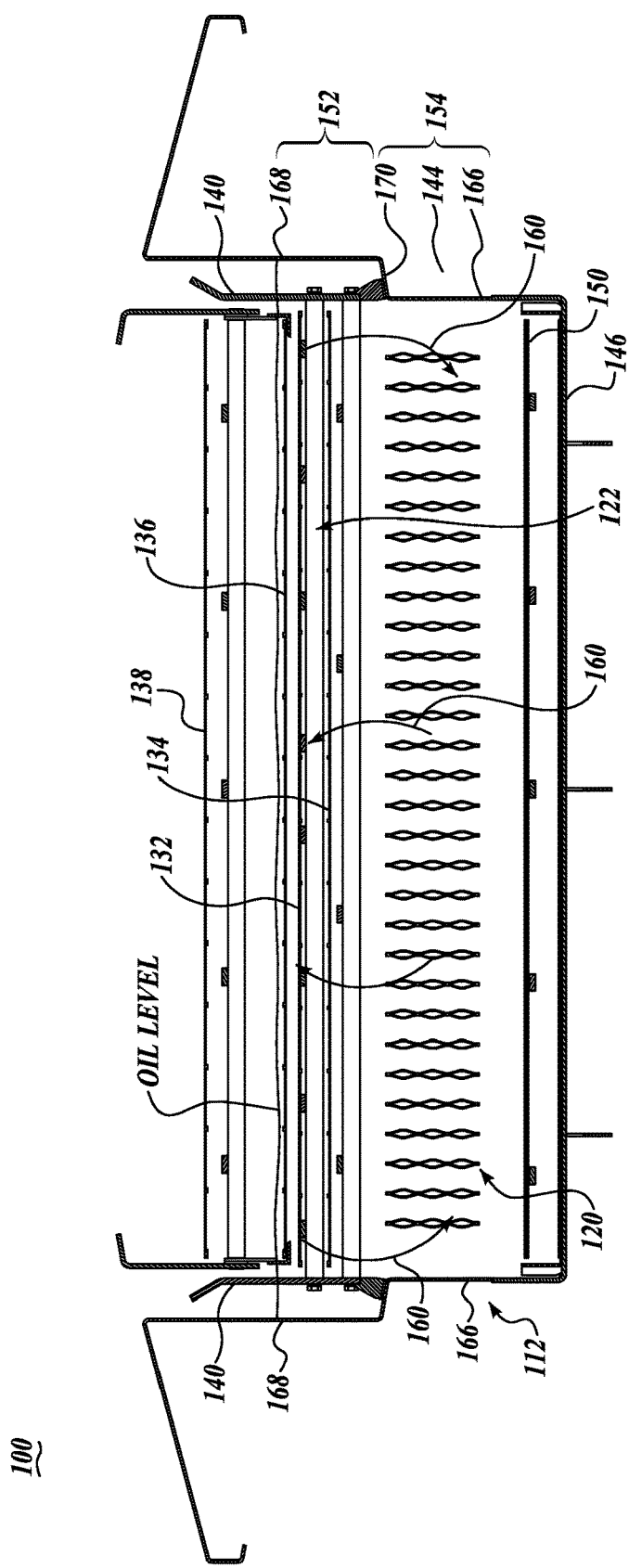
FIG. 5 is a cross-sectional view of a fryer tank constructed in accordance with the present disclosure.

FIGS. 3, 4 and 5 illustrate an industrial frying apparatus 100 of the present disclosure. The apparatus 100 includes a tank or trough 112 supported on a plurality of spaced-apart legs 114 extending downwardly from the underside of the trough to support the trough above the floor. A hood 116 is shown in upwardly retracted position. The hood 116 may be raised and lowered by lifting actuators 118 which are spaced along each side of the trough 112. The actuators 118 may be hydraulically, pneumatically, or electrically controlled.

FIG. 3 shows the heating element or heat exchanger 120 also in an upward retracted position. If a heating element is used, it can be powered electrically or by other means. If a heat exchanger is used, the oil is heated externally of the tank 112 and circulated through the heat exchange by a circulation pump. Exterior heaters for the oil are well known in the art.

A conveying system 122 is shown in FIG. 3, as positioned beneath the hood 116 and above a heat exchanger or heating element 120. The conveying system 122 conveys food to be fried from left to right in FIGS. 3 and 4. The outlet end 124 of conveying system 122 is in the form of an upward ramp section 126 that delivers the cooked food to an exit slide 128. A collection container or take away conveyor (not shown) may be positioned beneath the exit slide 128.

A hold down conveyor 130 may be used to hold the food being cooked downwardly within the cooking oil as the food is being conveyed through the trough or tank 112 on conveying system 122. Such hold down conveyor 130 does not necessarily extend the full length of the main conveying system 122.

FIG. 5 depicts in cross-section portions of the frying apparatus of FIGS. 3 and 4, wherein the main conveying system 122 is illustrated as disposed within tank 112 above heat exchanger/heating element 120 located in the lower portion of the tank. As shown in the Figures, conveying system 122 includes an upper run 132 on which food being cooked is carried, and a lower return run 134. The hold down conveyor system 130 is shown disposed above the main conveyor 132. The lower hold down run 136 of the hold down conveyor system is shown spaced slightly above the conveying run 132 of the main conveying system 122. The return run 138 of the hold down conveyor is positioned above the hold down run 136. Conveyor side bars 140 support the main conveyor 122 within the tank 12. The conveying system 122 is raised and lowered relative to the tank 112 by lifting actuators 118 spaced along the length of the frying apparatus 100, see FIG. 1.

A sediment conveyor system 150 is schematically illustrated as positioned along the tank floor 146. The purpose of the sediment conveyor is to seek to collect and remove sediment, such as batter or breading which has detached from the food being cooked.

In use, when food is being carried through the apparatus 100 by main conveying system 122 and the oil within the tank 112 is heated by the heat exchanger/heating element 120, the cold food product entering the upper portion of the tank, in what is termed the "product zone" 152, causes the oil temperature to drop. As a consequence, a control system which controls the operation of the frying apparatus 100 requests more heat from the heating elements/heat exchanger 120 in an effort to maintain a set cooking oil temperature. Thereupon, the heat exchanger/heating element will transfer more heat to the cooking oil and raise the temperature of the oil in a lower "heating zone" 154 wherein the heater/heat exchanger 120 is located. The hotter oil in the heating zone is less dense than the cooler oil in the product cooking zone, causing the hot oil to rise and the cooler oil to drop, creating a cyclical flow of the cooking oil in the tank 112, as shown by the arrows 160 in FIG. 5.

Referring primarily to FIG. 5, the tank 112 is constructed with side walls 144 which are shown as constructed with a narrower lower wall section 166 corresponding to the elevation of the heating zone 154 of the tank and a wider upper side wall section 168 corresponding to the elevation of the product zone 152 of the tank 112. A ledge or shoulder 170 extends laterally outwardly from the upper edge portion of lower side wall 166 to intersect with the lower edge portion of the upper side wall 168. The width of the shoulder or ledge 170 may be in the range of, for example, approximately 1.5 to approximately 3 inches, with the overall width of the tank lower portion (spanning between side walls 166) being from, for example, approximately 16 to 60 inches or more. This reduction in the width of the tank at the heating zone results in a reduction in the volume of the heated oil by about 5.5% for a 40 inch wide cooking zone, by about 6.3% for a 34 inch wide cooking zone and by about 8.5% for a 24 inch cooking zone. As also shown in FIG. 5, the conveyor side bars 140 for the main conveying system 122 are supported on the shoulder/ledge 170. The side bars 140 are generally aligned with the locations of the tank lower side walls 166. The side bars support the conveying system 122 on the shoulders 170. The side bars may be in the form of a wall structure or partial wall structure or may be of other constructions.

The construction of tank 112 shown in FIGS. 3 and 4, provides numerous advantages over the tank 12 shown in FIGS. 1 and 2. For example, with the shoulders 170 formed in the tank side walls 144, the tank is of increased lateral structural strength. As a result, the tank requires less bracing or can be constructed from a thinner gauge material than the tank shown in FIGS. 1 and 2.

In addition, the overall volume of the tank in the heating zone is less than the volume of the tank shown in FIG. 2, but with the conveying systems 22 and 122 being of the same size. This reduction in the tank width in the heating zone means that less cooking oil effectively must be heated for cooking the same quantity of product as in apparatus 10. In this regard, the conveyor side bars 140 which sit on the ledges 170 create a baffle wall which tends to contain the higher temperature cooking oil within the width of the conveyor. However, in the tank shown in FIGS. 1 and 2, all of the oil in the upper cooking zone, for the full width of the tank, constitutes directly heated oil.

Temperature loss in the oil occurs along the sides of the tanks 12 and 112. The oil located outwardly of the conveyor side bars 140 provides a thermal buffer since the oil in that region of the tank is isolated from direct heating. The overall effect of the construction of the fryer 100 is that, even though the total volume of the oil on the tanks 12 and 112 may be the same or similar, the effective heated volume of oil in tank 112 is reduced from the effective heat volume of oil in tank 12, while the desired temperature distribution of the heated oil within the tank 112 is maintained.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An elongated cooking tank for a food fryer, the tank configured to hold cooking oil, the tank adapted to house a conveying system extending along a length of the tank for conveying food through the cooking tank as the food is being cooked and the tank adapted to house a heater for heating the cooking oil or adapted to receive a heated cooking oil, the cooking tank comprising:
an inlet end and an outlet end;
side walls extending longitudinally of the tank length from the inlet end to the outlet end, each of the side walls defining a lower portion and an upper portion;
a bottom spanning across a width of the tank at the lower portions of the side walls;
the lower portions of the tank side walls defining a tank lower portion having a first width, the tank lower portion defining a lower heating zone for receiving the heated cooking oil;
the upper portions of the tank side walls defining a tank upper portion located above the tank lower portion, a second tank width defined by the upper portions of the tank side walls wherein the food being cooked is conveyed by the conveying system through the tank upper portion, the cooking oil having been heated in the tank lower portion or received in the tank lower portion; and
wherein the tank first width corresponding to the tank lower portion is narrower than the tank second width corresponding to the tank upper portion; and
a shoulder defining an interface between the tank lower portion and the tank upper portion, said shoulder extending outwardly from the tank lower portion side walls to the tank upper portion side walls, said shoulders supporting the conveying system.

2. The cooking tank according to claim 1, wherein the portion of the cooking tank corresponding to the tank upper portion is configured to support the conveying system.

3. The cooking tank according to claim 1, wherein a portion of the conveying system has support portions extending upwardly from the cooking tank shoulder and spaced inwardly of the tank upper portion side walls.

4. The cooking tank according to claim 1, said shoulder defining a surface for supporting the conveying system.

5. The cooking tank according to claim 4, wherein a portion of the conveying system extends upwardly from the shoulder of the cooking tank at a lateral location relative to the cooking tank and spaced inwardly of cooking tank side walls at the wider portion of the cooking tank corresponding to the tank upper portion.

6. The cooking tank according to claim 1, wherein the shoulder extends from 1.5 inches to 3.0 inches laterally outwardly of the tank lower portion side walls.

7. A cooking apparatus for frying foods on an industrial scale, the cooking apparatus comprising:
(a) the cooking tank of claim 1 having a length and a width and a depth defined by side walls for holding heated cooking oil;
(b) a food conveyance system for conveying food being cooked through the cooking tank;
(c) a heating system comprising a heater located in the lower portion of the cooking tank or comprising openings for receiving heated cooking oil from an external heating source;
(d) wherein the cooking tank comprises:
(i) the lower heating zone for housing the heating system or the inlets for heated cooking oil;
(ii) the upper product zone through which the food conveyance system conveys food being cooked; and
(e) wherein the width between the cooking tank side walls corresponding to the lower heating zone is less than the width of the cooking tank side walls corresponding to the upper product zone.

8. The cooking apparatus according to claim 7, wherein the cooking tank is configured to define the shoulder along the side walls of the cooking tank at the interface between the cooking tank narrower side wall portion corresponding to the lower heating zone and the cooking tank wider side wall portion corresponding to the upper product zone.

9. The cooking apparatus according to claim 8, wherein the shoulder of the cooking tank is adapted to support the food conveyance system.

10. The cooking apparatus according to claim 9, wherein the food conveyance system comprises a support structure that extends upwardly from the shoulders of the cooking tank at a location spaced inwardly from the side walls of the cooking tank along the tank wider portion corresponding to the upper product zone.

11. The cooking apparatus according to claim 8, wherein the shoulder has a width from about 1.5 inches to about 3.0 inches.

12. The cooking apparatus according to claim 7, wherein a ledge extends along the side walls of the cooking tank at the interface between the narrower cooking tank portion corresponding to the lower heating zone and the wider cooking tank portion corresponding to the upper product zone, the ledge extending outwardly of the lower heating zone.

13. The cooking apparatus according to claim 11, wherein the food conveyance system is supported within the cooking tank by a ledge.

14. The cooking apparatus according to claim 12, wherein the food conveyance system comprises support elements that extend lengthwise along the cooking tank on the ledge between the lower heating zone and the upper product zone, said support elements defining a portion of the cooking tank extending between the side walls of the cooking tank in the product zone and the conveyance system support elements.

15. The cooking apparatus according to claim 7, further comprising a hold down conveyor system disposed above the food conveyance system, said hold down conveyor system having a lower conveyer run spaced above the food conveyance system.

16. The cooking apparatus according to claim 7, further comprising a sediment conveyor system positioned along the bottom of the cooking tank to collect and remove sediment from the cooking tank.

\* \* \* \* \*

UNITED STATES PATENT AND TRADEMARK OFFICE
CERTIFICATE OF CORRECTION

Page 1 of 1

PATENT NO. : 10,383,478 B2
APPLICATION NO. : 14/512220
DATED : August 20, 2019
INVENTOR(S) : T. O. Baumgardner et al.

It is certified that error appears in the above-identified patent and that said Letters Patent is hereby corrected as shown below:

In the Claims

| Column | Line | ERROR |
|---|---|---|
| 6 (Claim 1, Line 14) | 6 | "tank side walls" should read --side walls-- |

Signed and Sealed this
Thirty-first Day of March, 2020

Andrei Iancu
*Director of the United States Patent and Trademark Office*